United States Patent [19]
Watanabe et al.

[11] Patent Number: 5,220,609
[45] Date of Patent: Jun. 15, 1993

[54] METHOD OF SPEECH RECOGNITION

[75] Inventors: Taisuke Watanabe, Sagamihara; Tatsuya Kimura, Kawasaki, both of Japan

[73] Assignee: Matsushita Electric Industrial Co., Ltd., Osaka, Japan

[21] Appl. No.: 777,713

[22] Filed: Oct. 21, 1991

Related U.S. Application Data

[63] Continuation-in-part of Ser. No. 503,080, Apr. 2, 1990, abandoned, which is a continuation of Ser. No. 167,794, Mar. 14, 1988, abandoned.

[30] Foreign Application Priority Data

| Mar. 13, 1987 | [JP] | Japan | 62-59407 |
| Mar. 13, 1987 | [JP] | Japan | 62-59413 |
| Mar. 23, 1987 | [JP] | Japan | 62-68436 |
| Mar. 24, 1987 | [JP] | Japan | 62-69344 |

[51] Int. Cl.$^5$ ............................................. G10L 5/00
[52] U.S. Cl. ........................................................ 381/43
[58] Field of Search .................................. 381/42-43; 395/2; 364/728.05

[56] References Cited

U.S. PATENT DOCUMENTS 3,816,722  6/1974  Sakoe .................................. 381/43

OTHER PUBLICATIONS

Kimura, et al., "A Telephone Speech Recognition System etc.," Proc. of ICASSP, Dallas, 1987, pp. 1175-1178.

Primary Examiner—Emanuel S. Kemeny
Attorney, Agent, or Firm—Lowe, Price, LeBlanc & Becker

[57] ABSTRACT

A method of speech recognition includes the steps of predetermining a series of parameters $a_1, a_2, \ldots, a_J$ representative of standard patterns of speeches of preset words, where the letter J denotes a predetermined natural number; deriving parameters $x_i$ representative of data of respective frames of an input signal, the adscript i denotes a frame number; calculating similarities $d_j^{(i)}$ between the parameters $a_j$ and the parameters $x_i$, where $j = 1, 2, \ldots, J$; calculating parameters $R_j^{(i)}$ for the respective preset words by referring to the following recurrence formulas:

$$R_1^{(i)} = d_1^{(i)}$$

$$R_j^{(i)} = d_j^{(i)} + \text{opt}(R_{j-1}^{(i-h)}, R_{j-1}^{(i-h-1)}, R_{j-1}^{(i-h-2)}, \ldots, R_{j-1}^{(i-h-m)})$$

where $j = 2, 3, \ldots, J$; the character h and m denote preset positive integers; and the character opt denotes an operator of selecting an optimal member of terms in related parentheses; and selecting one of the preset words as a recognition result, the selected word corresponding to an optimal value of the parameters $R_j^{(i)}$.

9 Claims, 5 Drawing Sheets

METHOD OF SPEECH RECOGNITION

CROSS-REFERENCES TO RELATED APPLICATIONS

This is a continuation-in-part of U.S. patent application Ser. No. 503,080, filed on Apr. 2, 1990, abandoned, which is a continuation of U.S. patent application Ser. No. 167,794, filed on Mar. 14, 1988 now abandoned.

BACKGROUND OF THE INVENTION

1. Field of the Invention

This invention relates to a method of speech recognition.

2. Description of the Prior Art

Some speech recognition systems require voices of a user to be preregistered. The preregistered voices are used as references in recognizing the contents of speech of the user.

Advanced speech recognition systems dispense with such voice preregistration and are usable by unspecified persons. The advanced systems include a word dictionary which holds standard voices in the form of parameters. During a speech recognition process, the patterns of input voices are compared with the patterns of standard voices.

U.S. Pat. No. 3,816,722 to Sakoe et al. relates to a pattern recognition system usable as a speech recognition system which includes a computer for calculating the similarity measure between at least two patterns. According to the system of U.S. Pat. No. 3,816,722, the feature vectors of a sequence representative of a first pattern are correlated to those in another sequence representative of a second pattern in such a manner that the normalized sum of the quantities representative of the similarity between each feature vector of a sequence and at least one feature vector of the other sequence may assume an extremum. The extremum is used as the similarity measure to be calculated between the two patterns. With the pattern recognition system, the similarity measure is calculated for each reference pattern and a variable-length partial pattern to be recognized. The partial pattern is successively recognized to be a permutation with repetitions of reference patterns, each having the maximum similarity measure. In the system of U.S. Pat. No. 3,816,722, before a comparison between similarity measures to determine a best-match reference pattern, the similarity measures are required to be normalized by a normalizing unit. This normalization increases the number of steps of calculation.

U.S. Pat. No. 4,751,737 to Gerson et al. relates to a method of generating word templates for a speech recognition system. The method of U.S. Pat. No. 4,751,737 includes the steps of generating an interim template, generating a time alignment path between the interim template and a token, mapping frames from the interim template and the token along the time alignment path onto an averaged time axis, and combining data associated with the mapped frames to produce composite frames representative of the final word template. U.S. Pat. No. 4,751,737 merely discloses the generation of standard patterns for a speech recognition system, and fails to show a main part of the speech recognition system.

U.S. Pat. No. 4,712,242 to Rajasekaran et al. relates a speaker-independent word recognizer in which the zero crossing intervals of the input speech are measured and sorted by duration to provide a rough measure of the frequency distribution within each input frame. The distribution of zero crossing intervals is transformed into a binary feature vector, which is compared with each reference template using a modified Hamming distance measure. A dynamic time warping algorithm is used to permit recognition of various speaker rates. A mask vector with each reference vector on a template is used to ignore insignificant (or speaker-dependent) features of the words detected. In the word recognizer of U.S. Pat. No. 4,712,242, pattern matching paths used in the calculation of a similarity between an input speech frame and a reference speech frame are fixed and therefore lack a flexibility.

Niyada et al. published "Simple Speech Recognition Method for Unspecified Speakers", Meeting of the Acoustical Society of Japan, March 1986, pp. 7–8. T. Kimura et al. published "A Telephone Speech Recognition System Using Word Spotting Technique Based on Statistical Measure", Proceedings of ICASSP, April, 1987, pp. 1175–1178. The speech recognition method by Niyada et al. and the speech recognition system by T. Kimura et al. use a common word-spotting speech recognition technique which will be described hereinafter.

The prior-art speech recognition technique is based on a pattern matching method by which a speech can be spotted from noise to enable a recognition process, and an interval of the speech can be detected. The pattern matching uses a distance measure (a statistical distance measure) as follows.

In cases where the speech length of an input word is linearly expanded or compressed to J frames and a parameter vector for one frame is expressed by $x_j$ ($j=1, 2, \ldots, J$), the input vector X is given as:

$$X = (x_1, x_2, \ldots, x_J)^t$$

where each vector $x_j$ has dimensions "p".

When standard patterns of preset words $\omega_k$ ($k=1, 2, \ldots, K$) are defined by average value vectors $\mu_k$ and covariance matrixes $W_k$, the recognition result is given by one of the preset words which maximizes a posterior probability $P(\omega_k | X)$.

Bayes' theorem induces the following equation.

$$P(\omega_k | X) = P(\omega_k) \cdot P(X | \omega_k) / P(X) \tag{1}$$

where the value $P(\omega_k)$ is regarded as a constant. When a normal distribution is assumed, the following equation is given.

$$P(X|\omega_k) = (2\pi)^{-d/2} |W_k|^{-\frac{1}{2}} \exp\{-\tfrac{1}{2}(X-\mu_k)^t \cdot W_k^{-1} \cdot (X-\mu_k)\} \tag{2}$$

where the superscript "t" denotes a transposed vector or matrix. It is assumed that the value P(X) follows a normal distribution of average value vectors $\mu_x$ and covariance matrixes $W_x$. Thus, the value P(X) is given as:

$$P(X) = (2\pi)^{-d/2} |W_x|^{-\frac{1}{2}} \exp\{-\tfrac{1}{2}(X-\mu_x)^t \cdot W_x^{-1} \cdot (X-\mu_x)\} \tag{3}$$

The logarithmic expression of the equation (1) after being substituted by the equations (2) and (3) takes the following form (4), provided that the constant terms are omitted.

$$L_k = (X-\mu_k)^t \cdot W_k^{-1} \cdot (X-\mu_k) - (X-\mu_x)^t \cdot W_x^{-1} \cdot (X-\mu_x) + \log |W_k| - \log |W_x| \tag{4}$$

It is assumed that the matrixes $W_k$ and $W_x$ are common, and are given by the following same matrix W.

$$W = (W_1 + W_2 + \ldots + W_k + W_x)/(k+1) \tag{5}$$

When the equation (4) is developed, the following equation is obtained.

$$L_k = B_k - A_k{}^t \cdot X \tag{6}$$

where:

$$A_k = 2(W^{-1} \cdot \mu_k - W^{-1} \cdot \mu_x) \tag{7}$$

$$B_k = \mu_k{}^t \cdot W^{-1} \cdot \mu_k - \mu_x{}^t \cdot W^{-1} \cdot \mu_x \tag{8}$$

when $A_k{}^t = (a_1^{(k)t}, a_2^{(k)t}, \ldots, a_J^{(k)t})$, the equation (6) is transformed into the following equation.

$$L_k = B_k - \sum_{j=1}^{J} (a_j^{(k)t} \cdot x_j) = B_k - \sum_{j=1}^{J} d_j^{(k)} \tag{9}$$

where the character $B_k$ denotes a bias constant and the character $d_j^{(k)}$ denotes the partial similarity for the word "k".

The calculation of the final similarly $L_k$ is simplified as described hereinafter. With reference to FIG. 1, in the case of collation between an input and a word "k", a partial period length "n" ($n_s^{(k)} \leq n \leq n_e^{(k)}$) is linearly expanded and compressed (extended and contracted) to a standard pattern length J, and similarities are calculated at fixed ends for respective frames. A similarity $L_k$ is calculated along the route from a point T in a line QR to a point P by referring to the equation (9).

Accordingly, the calculation of the similarities for one frame is performed within a range $\Delta$PQR. Since the values $x_j$ in the equation (9) mean j-th frame components after the expansion and compression of a period length "n", a corresponding input frame i' is present. Thus, partial similarities $d_j^{(k)}(i)$ are expressed by use of an input vector and are specifically given as:

$$d_j^{(k)}(i') = a_j^{(k)t} \cdot x_{i'} \tag{10}$$

where:

$$i' = i - rn(j) + 1 \tag{11}$$

In the equation (11), the character rn(j) represents a function between the lengths "n" and "j". Accordingly, provided that partial similarities between respective frames of an input and standard patterns $a_j^{(k)}$ are predetermined, the equation (9) can be easily calculated by selecting and adding the partial similarities having portions related to the frame i'. In view of the fact that the range $\Delta$PQR moves rightward frame by frame, partial similarities between the vectors $a_j^{(k)}$ and $x_i$ are calculated on the line PS, and their components corresponding to the range $\Delta$PQS are stored in a memory and are shifted every frame. In this case, since necessary similarities are all present in the memory, repetitive processes in similarity calculations can be prevented.

FIG. 2 shows a prior-art speech recognition apparatus using the previously-mentioned word-spotting technique. With reference to FIG. 2, the prior-art speech recognition apparatus includes an analog-to-digital (A/D) converter 1 which changes an input analog speech signal into a corresponding digital speech signal having 12 bits. In the A/D converter 1, the input analog speech signal is sampled at a frequency of 8 KHz. The digital speech signal is outputted from the A/D converter 1 to a speech analyzer 2. In the speech analyzer 2, the digital speech signal is subjected to LPC analyzation every 10 msec (one frame) so that 10-th order linear prediction coefficients and residual powers are derived. A feature parameter extractor 3 following the speech analyzer 2 calculates LPC cepstrum coefficients $c_1$–$c_5$ and a power term $c_0$ from the linear prediction coefficients and the residual powers. The calculated LPC cepstrum coefficients and power term constitute feature parameters. Accordingly, a feature vector $x_i$ for a frame "i" is given as:

$$x_i = (c_1, c_2, \ldots, c_5) \tag{12}$$

A frame sync signal generator 4 outputs timing signals (frame signals) at intervals of 10 msec. A speech recognition process is performed synchronously with the frame signals. The frame signals are applied to the speech analyzer 2 and the feature parameter extractor 3. The sync signal generator 4 also outputs a timing signal to a standard pattern selector 5.

A standard pattern storage 6 holds standard patterns of preset words identified by numbers k = 1, 2, . . . , K respectively. The standard pattern selector 5 outputs a control signal to the standard pattern storage 6 in synchronism with the timing signal. During a one-frame interval, the output control signal from the standard pattern selector 5 sequentially represents the word numbers k = 1, 2, . . . , K so that the standard patterns corresponding to the word numbers k = 1, 2, . . . , K are sequentially selected and transferred from the standard pattern storage 6 to a partial similarity calculator 7. The partial similarity calculator 7 determines a partial similarity $d_j^{(k)}(i)$ between a selected standard pattern $a_j^{(k)t}$ and a feature vector $x_i$ by referring to the following equation:

$$d_j^{(k)}(i) = a_j^{(k)t} \cdot x_i{}^t \tag{13}$$

where j = 1, 2, . . . , J. The calculated partial similarities are sequentially stored into a similarity buffer 12. In general, each time a new partial similarity is stored into the similarity buffer 12, the oldest partial similarity is erased from the similarity buffer 12.

The word number signal outputted from the standard pattern selector 5 is also applied to a proposed period setting section 8. The proposed period setting section 8 sets a minimal length $n_s^{(k)}$ and a maximal length $n_e^{(k)}$ of a word designated by the word number signal. Signals representative of the minimal length and the maximal length of the word are fed from the proposed period setting section 8 to a time expansion and compression table 13. The time expansion and compression table 13 stores data of an input frame i' which are plotted as a function of a word length "n" and a frame "j" according to the relation of the equation (11). When a word length "n" and a frame "j" are designated as an address signal fed to the time expansion and compression table, data of the input frame i' corresponding to the designated word length "n" and the frame "j" is read out from the time expansion and compression table 13. Such a readout process is periodically reiterated while the designated word length "n" is sequentially updated in the range between the minimal length $n_s^{(k)}$ and the maximal length $n_e^{(k)}$. As a result, data representing different input frames i' are sequentially read out from the time expansion and compression table 13 for the respective word lengths "n" between the minimal length $n_s^{(k)}$ and the maximal length $n_e^{(k)}$. The readout data of the input frame i' is fed to the similarity buffer 12.

The partial similarity $d_j^{(k)}(i')$ corresponding to the input frame i' is read out from the similarity buffer 12. The readout of the partial similarity is executed for each frame "j" (j=1, 2, ..., J), so that the partial similarities are sequentially read out from the similarity buffer 12. A similarity adder 14 sums the partial similarities $d_j^{(k)}(i')$ readout from the similarity buffer 12, and calculates a final similarity $L_k$ according to the equation (9). A signal representative of the calculated final similarity $L_k$ is outputted to a similarity comparator 10. The similarity comparator 10 selects the greater of the input similarity and a similarity fed from a temporary memory 11. The selected greater similarity is stored into the temporary memory 11. Accordingly, the similarity held by the temporary memory 11 is updated when the input similarity is greater. On the other hand, the similarity held by the temporary memory 11 remains unchanged when the input similarity is smaller. The similarity comparator 10 also serves to store the word number "k" into the temporary memory 11, the word number "k" corresponding to the similarity stored in the temporary memory 11. As a result, the greatest similarity and the corresponding word number remain in the temporary memory 11.

During a start of overall operation, a first frame i=io is processed. Specifically, the greatest similarity $L_1^{io}$(max) is determined for the period-length range of $n_s^{(1)} \leq n \leq n_e^{(1)}$ with respect to a standard pattern k=1. The greatest similarity $L_1^{io}$(max) is stored in the temporary memory 11. Then, the greatest similarity $L_2^{io}$(max) is determined for the period-length range of $n_s^{(2)} \leq n \leq n_e^{(2)}$ with respect to a standard pattern k=2. The similarity $L_2^{io}$(max) is compared with the previous similarity $L_1^{io}$(max) by the similarity comparator 10. The greater of the compared similarities is selected and is stored into the temporary memory 11 by the similarity comparator 10. Similar processes are repeated for respective standard patterns k=3, 4, ..., K. As a result, the actually greatest similarity $L_{k'}^{io}$(max) is determined. The greatest similarity $L_{k'}^{io}$(max) and the corresponding word number k' are stored into the temporary memory 11.

During a stage following the start, subsequent frames i=io+Δi are processed in a way similar to the way of processing the first frame. After a final frame i=I is processed, the word number k=$k_m$ held in the temporary memory 11 represents the result of speech recognition. In cases where the frame number i=$i_m$ and the word length n=$n_m$ corresponding to the greatest similarity are stored into the temporary memory 11 and are allowed to be updated, the speech period corresponding to the result of speech recognition is also determined. The determined speech period is given as: $i_m - n_m \sim i_m$.

The prior-art speech recognition method used by the apparatus of FIG. 2 has the following problem. The calculation of a similarity $L_k$ according to the equation (9) requires a very large number of calculating steps and a very large memory capacity. Specifically, the required memory capacity for processing one word corresponds to $n \times J/2$ words, and the required number of times of calculation corresponds to $n \times J \times P$ per frame where P denotes a parameter order number. In the typical case where J=16 and n=48 and P=6, the required memory capacity corresponds to 384 words and the required number of times of calculation corresponds to 4,608 per frame.

SUMMARY OF THE INVENTION

It is an object of this invention to provide a method of speech recognition which is improved over the prior-art speech recognition method used by the apparatus of FIG. 2. The speech recognition method of this invention enables a required memory capacity and a required number of times of calculation to be smaller than those in the prior-art speech recognition method used by the apparatus of FIG. 2. In the following description, the word-number-identifying adscript (superscript) "k" will be omitted from each of the characters "a", "d", and "R" for simplicity, and thus the characters "$a_j$", "$d_j(i)$", and "$R_j(i)$" will be used instead of the characters "$a_j^{(k)}$", "$d_j^{(k)}(i)$", and "$R_j^{(k)}(i)$" respectively.

A first aspect of this invention provides a method of speech recognition, comprising the steps of predetermining a series of parameters $a_1, a_2, \ldots, a_J$ representative of standard patterns of speeches of preset words, where the letter J denotes a predetermined natural number common for all the preset words; deriving parameters $x_i$ representative of data of respective frames of an input signal, the adscript i denotes a frame number; calculating similarities $d_j^{(i)}$ between the parameters $a_j$ and the parameters $x_1$, where j=1, 2, ..., J; calculating parameters $R_j^{(i)}$ for the respective preset words by referring to the following recurrence formulas:

$$R_1^{(i)} = d_1^{(i)}$$

$$R_j^{(i)} = d_j^{(i)} + \max(R_{j-1}^{(i-h)}, R_{j-1}^{(i-h-1)}, R_{j-1}^{(i-h-2)}, \ldots, R_{j-1}^{(i-h-m)})$$

where j=2, 3, ..., J; the character h and m denote preset positive integers; and the character max denotes an operator of selecting a maximal member of terms in related parentheses; and selecting one of the preset words as a recognition result, the selected word corresponding to a maximal value of the parameters $R_j^{(i)}$.

A second aspect of this invention provides a method of speech recognition, comprising the steps of predetermining a series of parameters $a_1, a_2, \ldots, a_J$ representative of standard patterns of speeches of preset words, where the letter J denotes a predetermined natural number; deriving parameters $x_i$ representative of data of respective frames of an input signal, the adscript i denotes a frame number; calculating similarities $d_j^{(i)}$ between the parameters $a_j$ and the parameters $x_i$, where j=1, 2, ..., J; calculating parameters $R_j^{(i)}$ for the respective preset words by referring to the following recurrence formulas:

$$R_1^{(i)} = d_1^{(i)}$$

$$R_j^{(i)} = d_j^{(i)} + \max(R_{j-1}^{(i-1)}, R_{j-1}^{(i-2)}, R_{j-1}^{(i-3)}, R_{j-1}^{(i-4)})$$

where j=2, 3, ..., J; the character max denotes an operator of selecting a maximal member of terms in related parentheses; and selecting one of the preset words as a recognition result, the selected word corresponding to a maximal value of the parameters $R_j^{(i)}$.

A third aspect of this invention provides a method of speech recognition, comprising the steps of predetermining a series of parameters $a_1, a_2, \ldots, a_J$ representative of standard patterns of speeches of preset words, where the letter J denotes a predetermined natural number; deriving parameters $x_i$ representative of data of respective frames of an input signal, the adscript i denotes a frame number; calculating similarities $d_j^{(i)}$ between the parameters $a_j$ and the parameters $x_i$, where $j=1, 2, \ldots, J$; calculating parameters $R_j^{(i)}$ for the respective preset words by referring to the following recurrence formulas:

$$R_1^{(i)} = d_1^{(i)}$$

$$R_j^{(i)} = d_j^{(i)} + \mathrm{opt}(R_{j-1}^{(i-h)}, R_{j-1}^{(i-h-1)}, R_{j-1}^{(i-h-2)}, \ldots, R_{j-1}^{(i-h-m)})$$

where $j=2, 3, \ldots, J$; the character h and m denote preset positive integers; and the character opt denotes an operator of selecting an optimal member of terms in related parentheses; and selecting one of the preset words as a recognition result, the selected word corresponding to an optimal value of the parameters $R_j^{(i)}$.

DESCRIPTION OF THE FIRST PREFERRED EMBODIMENT

Figure 3:
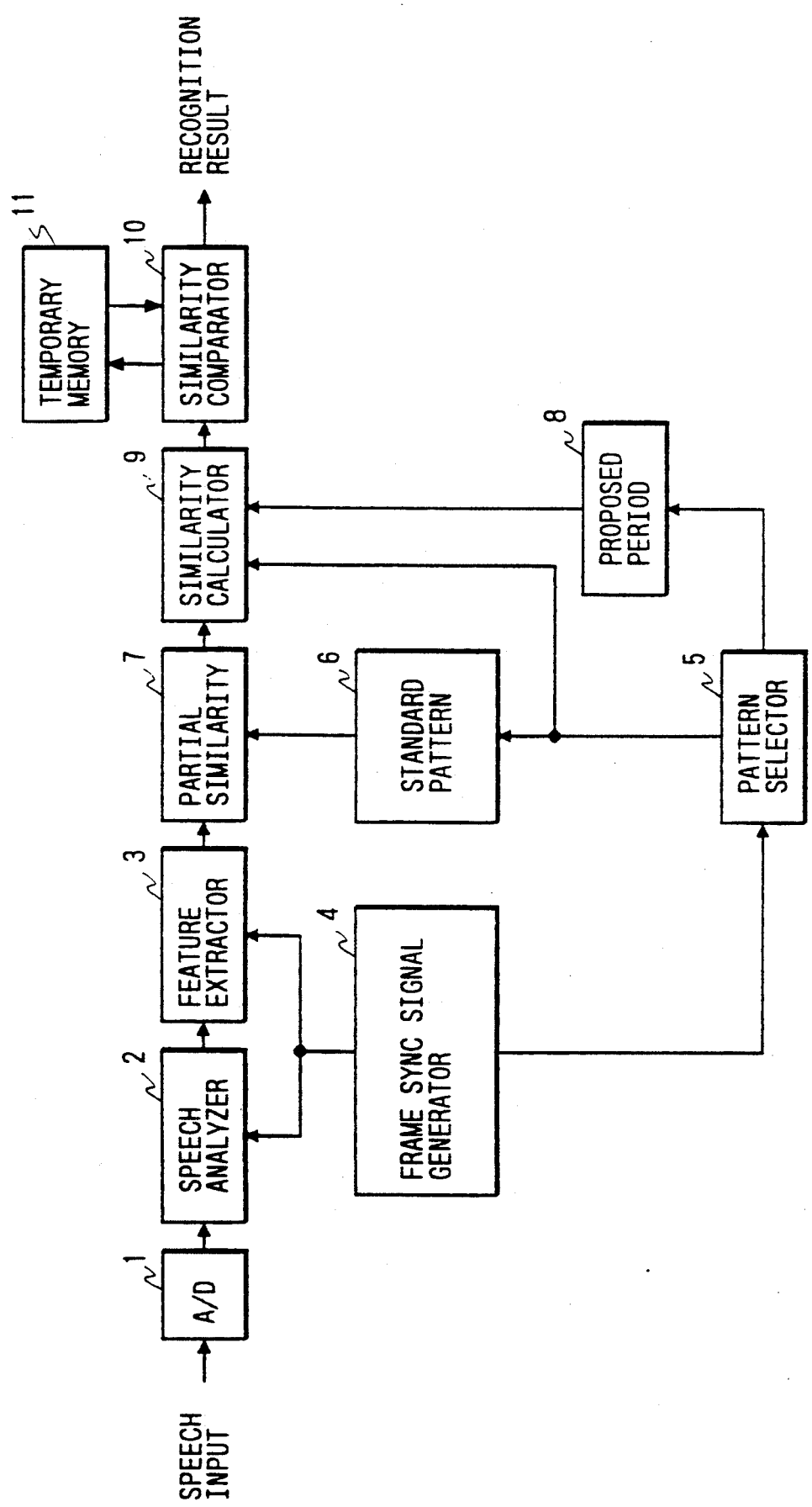
FIG. 3 is a block diagram of a speech recognition apparatus using a speech recognition method according to a first embodiment of this invention.

FIG. 3 shows a speech recognition apparatus using a method of speech recognition according to a first embodiment of this invention. With reference to FIG. 3, the speech recognition apparatus includes an analog-to-digital (A/D) converter 1 which changes an input analog speech signal into a corresponding digital speech signal having 12 bits. In the A/D converter 1, the input analog speech signal is sampled at a frequency of 8 KHz. The digital speech signal is outputted from the A/D converter 1 to a speech analyzer 2. In the speech analyzer 2, the digital speech signal is subjected to LPC analyzation every 10 msec (one frame) so that 10-th order linear prediction coefficients and residual powers are derived. A feature parameter extractor 3 following the speech analyzer 2 calculates LPC cepstrum coefficients $c_1$-$c_5$ and a power term $c_0$ from the linear prediction coefficients and the residual powers. The calculated LPC cepstrum coefficients and power term constitute feature parameters. Accordingly, a feature vector $x_i$ for a frame "i" is given as:

$$x_i = (c_1, c_2, \ldots, c_5) \quad (14)$$

A frame sync signal generator 4 outputs timing signals (frame signals) at intervals of 10 msec. A speech recognition process is performed synchronously with the frame signals. The frame signals are applied to the speech analyzer 2 and the feature parameter extractor 3. The sync signal generator 4 also outputs a timing signal to a standard pattern selector 5.

A standard pattern storage 6 holds standard patterns of preset words identified by numbers $k=1, 2, \ldots, K$ repectively. The standard pattern selector 5 outputs a control signal to the standard pattern storage 6 and a similarity calculator 9 in synchronism with the timing signal. During a one-frame interval, the output control signal from the standard pattern selector 5 sequentially represents the word numbers $k=1, 2, \ldots, K$ so that the standard patterns corresponding to the word numbers $k=1, 2, \ldots, K$ are sequentially selected and transferred from the standard pattern storage 6 to a partial similarity calculator 7. The partial similarity calculator 7 determines a partial similarity $d_j^{(k)}(i)$ between a selected standard pattern $a_j^{(k)t}$ and a feature vector $x_i$ by referring to the following equation.

$$d_j^{(k)}(i) = a_j^{(k)t} \cdot x_i^t \quad (15)$$

where $j=1, 2, \ldots, J$. That is, J is common for all the preset words. The calculated partial similarities are sequentially fed to the similarity calculator 9 which forms a feature of this embodiment.

The word number signal outputted from the standard pattern selector 5 is also applied to a proposed period setting section 8. The proposed period setting section 8 sets a minimal length $n_s^{(k)}$ and a maximal length $n_e^{(k)}$ of a word designated by the word number signal. Signals representative of the minimal length and the maximal length of the word are fed from the proposed period setting section 8 to the similarity calculator 9.

Figure 2:
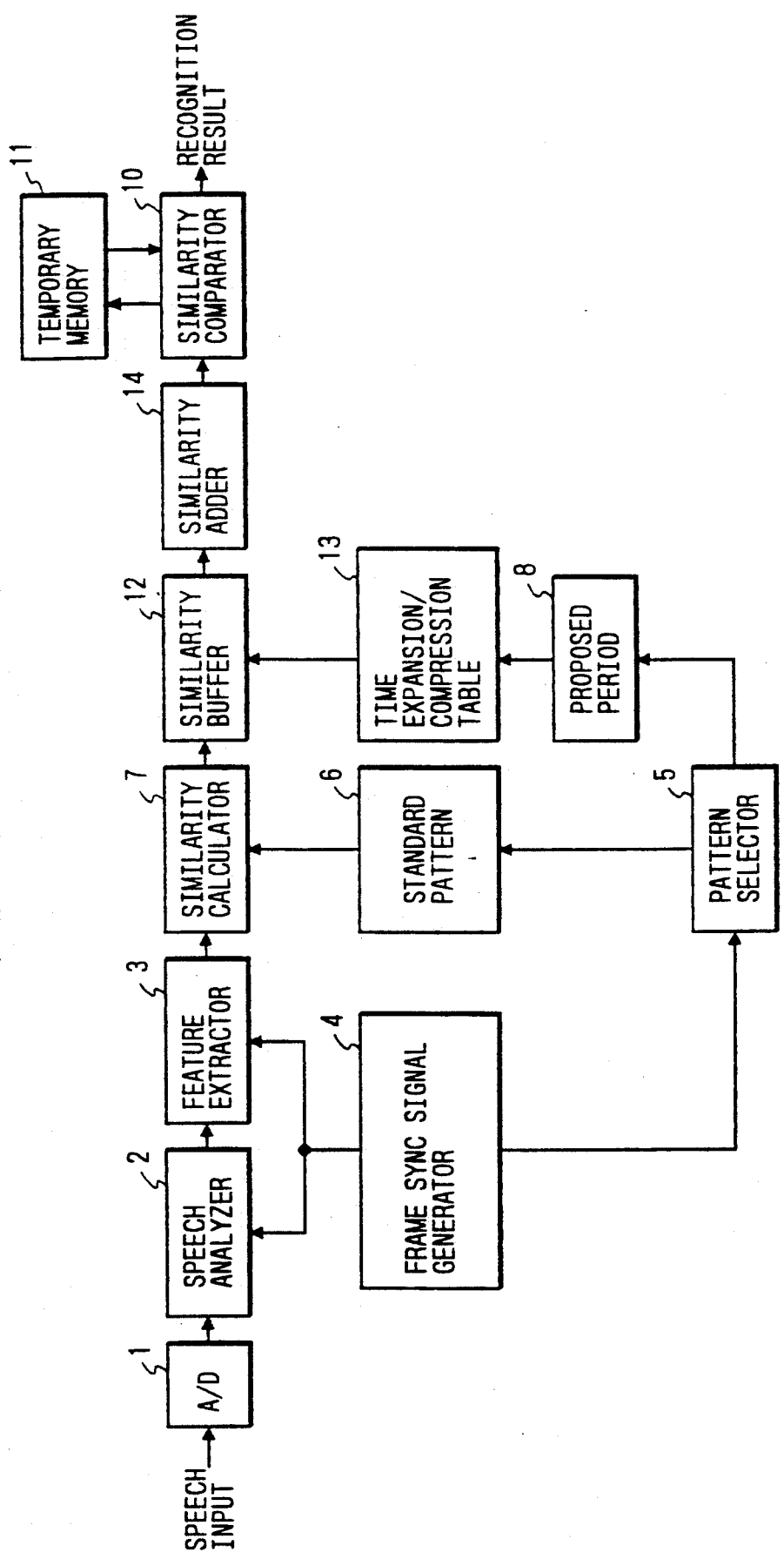
FIG. 2 is a block diagram of a prior-art speech recognition apparatus.

The similarity calculator 9 derives a final similarity or likelihood $L_k$ from the partial similarities $d_j^{(k)}(i)$ and the minimal and maximal word lengths $n_s^{(k)}$ and $n_e^{(k)}$ according to a new process different from the corresponding process in the prior-art apparatus of FIG. 2. A signal representative of the derived final similarity $L_k$ is outputted to a similarity comparator 10.

The similarity comparator 10 selects the greater of the input similarity and a similarity fed from a temporary memory 11. The selected greater similarity is stored into the temporary memory 11. Accordingly, the similarity held by the temporary memory 11 is updated when the input similarity is greater. On the other hand, the similarity held by the temporary memory 11 remains unchanged when the input similarity is smaller. The similarity comparator 10 also serves to store the word number "k" into the temporary memory 11, the word number "k" corresponding to the similarity stored in the temporary memory 11. As a result, the greatest similarity and the corresponding word number remain in the temporary memory 11.

During a start of overall operation, a first frame i=io is processed. Specifically, the greatest similarity $L_1^{io}(\mathrm{max})$ is determined for the period-length range of $n_s^{(1)} \leq n \leq n_e^{(1)}$ with respect to a standard pattern $k=1$. The greatest similarity $L_1^{io}(\mathrm{max})$ is stored in the temporary memory 11. Then, the greatest similarity $L_2^{io}(\mathrm{max})$ is determined for the period-length range of $n_s^{(2)} \leq n \leq n_e^{(2)}$ with respect to a standard pattern $k=2$. The similarity $L_2^{io}(\mathrm{max})$ is compared with the previous similarity $L_1^{io}(\mathrm{max})$ by the similarity comparator 10. The greater of the compared similarities is selected and is stored into the temporary memory 11 by the similarity comparator 10. Similar processes are repeated for respective standard patterns $k=3, 4, \ldots, K$. As a result, the actually greatest similarity $L_k^{io}(\mathrm{max})$ is determined. The greatest similarity $L_k^{io}(\mathrm{max})$ and the corresponding word number k' are stored into the temporary memory 11.

During a stage following the start, subsequent frames $i = i_0 + \Delta i$ are processed in a way similar to the way of processing the first frame. After a final frame $i = I$ is processed, the word number $k = k_m$ held in the temporary memory 11 represents the result of speech recognition. In cases where the frame number $i = i_m$ and the word length $n = n_m$ corresponding to the greatest similarity are stored into the temporary memory 11 and are allowed to be updated, the speech period corresponding to the result of speech recognition is also determined. The determined speech period is given as: $i_m - n_m \sim i_m$. In the following description, the word-number-identifying adscript (superscript) "k" will be omitted from each of the characters "a", "d", and "R" for simplicity, and thus the characters "$a_j^{(k)}$", "$d_j^{(k)}(i)$", and "$R_j^{(i)}$" will be used instead of the characters "$a_j^{(k)}$", "$d_j^{(k)}(i)$", and "$R_j^{(k)(i)}$" respectively.

Figure 4:
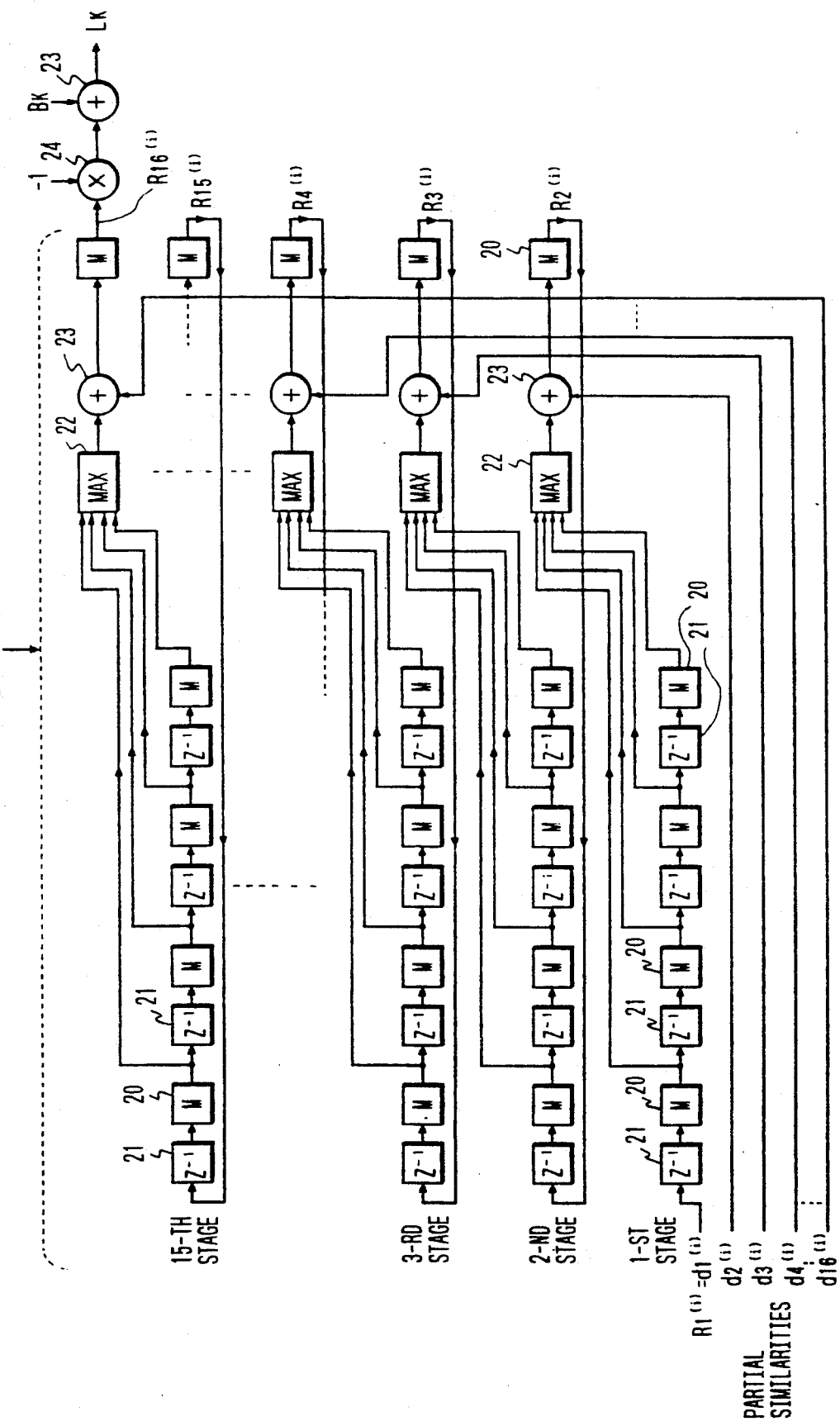
FIG. 4 is a block diagram of the similarity calculator of FIG. 3.

The similarity calculator 9 includes similar units which correspond to the standard patterns respectively. One of these units is selected in accordance with the standard pattern which is generally identified by "i" in the following description. FIG. 4 shows an internal structure of one unit in the similarity calculator 9.

As shown in FIG. 4, the similarity calculator 9 includes 15 similar circuits or stages each having a series combination of memory elements 20 and delay elements 21 arranged alternately. In each of these stages except the final stage, the memory elements 20 are connected to a maximal value detection element 22 which is connected via an adder 23 to an additional memory element 20 connected to the first delay element 21 of the subsequent stage. In the final stage, the memory elements 20 are connected to a maximal value detection element 22 which is connected via an adder 23 to an additional memory element 20 connected to a series combination of a multiplier 24 and an adder 23. The first partial similarity $d_1^{(i)}$ is applied to the first delay element of the first stage. The subsequent partial similarities $d_2^{(i)}, \ldots, d_{16}^{(i)}$ are applied to the adders 23 of the other stages respectively.

During an initializing process, initialization signals preset the contents of the memory elements 20 to $-\infty$. After a subsequent period where 64 frame sync signals (pulses) are received, the partial similarities $d_1^{(i)}, \ldots, d_{16}^{(i)}$ derived from the input speech are inputted. Each time a frame sync signal is received, the delay elements 21 shift signals from their input sides to their output sides. The final memory elements 20 of the respective stages hold partial accumulation values $R_2^{(i)}, \ldots, R_{16}^{(i)}$ which are expressed as:

$$R_j^{(i)} = d_j^{(i)} + \max(R_{j-1}^{(i-1)}, R_{j-1}^{(i-2)}, R_{j-1}^{(i-3)}, R_{j-1}^{(i-4)}) \quad (16)$$

where $j = 2, 3, \ldots, 16$, and the character max denotes an operator of selecting the maximum member of terms in related parentheses. The first value $R_1^{(i)}$ is given as:

$$R_1^{(i)} = d_1^{(i)}$$

Accordingly, the accumulation value $R_{16}^{(i)}$ of the final stage is given as:

$$R_{16}^{(i)} = \max_{\{E(x)\}} \left( \sum_{j=1}^{16} d_j^{(i-E(j-1))} \right) \quad (17)$$

where the character $\{E(x)\}$ represents a group of all functions satisfying the following relations.

$$x/4 \leq E(x) \leq x, \frac{1}{4} \leq dE(x)/dx \leq 1 \quad (18)$$

The value $L_k$ is finally given as:

$$L_k = -R_{16}^{(i)} + B$$

where the letter B denotes a bias constant.

In the similarity calculator of FIG. 4, the multiplier 24 converts the value $R_{16}^{(i)}$ into the value $-R_{16}^{(i)}$, and the following adder 23 adds the value $-R_{16}^{(i)}$ and the bias constant B to obtain the value $L_k$.

In a general case, the recurrence formulas corresponding to the equation (16) are given as:

$$R_1^{(i)} = d_1^{(i)}$$

$$R_j^{(i)} = d_j^{(i)} + \max(R_{j-1}^{(i-h)}, R_{j-1}^{(i-h-1)}, R_{j-1}^{(i-h-2)}, \ldots, R_{j-1}^{(i-h-m)})$$

where $j = 2, 3, \ldots, J$; the character "h" and "m" denote preset positive integers (which are 1 and 3 respectively in the equation (16); and the character max denotes an operator of selecting a maximal member of terms in related parentheses.

Figure 1:
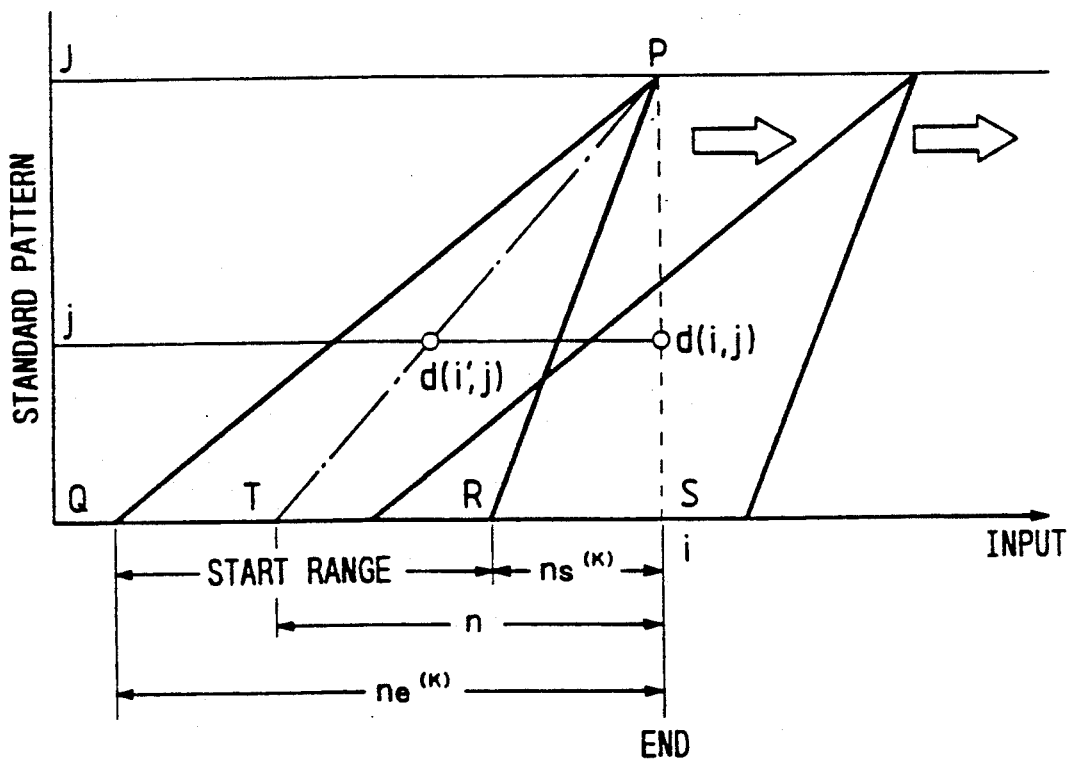
FIG. 1 is a diagram showing a prior-art process of calculation of similarities.

With reference to FIG. 1, the equation (17) means that optical matching is performed for a set of all curves PT having an inclination of 1-4 and residing within the region $\Delta$PQR.

This embodiment has an advantage over the prior-art speech recognition method of FIG. 2 in a memory capacity and a calculation quantity required to calculate a value $L_k$ from partial similarities per frame. The advantage of this invention will be specifically explained hereinafter. In the prior-art method of FIG. 2, a required memory capacity for processing one word corresponds to the number of words which is equal to the number of lattice points in the region $\Delta$PQR, and thus the required memory capacity corresponds to $J \times n_e^{(k)}/2$ words. Accordingly, in the typical case where $J = 16$ and $n_e^{(k)} = 64$, the required memory capacity corresponds to 512 words. On the other hand, in this embodiment, a required memory capacity corresponds to the number of words which is equal to the number of the memory elements 20, and thus the required memory capacity corresponds to $5 \times J$ words. In the typical case where $J = 16$, the required memory capacity corresponds to 80 words. Thus, the required memory capacity in this embodiment is equal to about one sixth of that in the prior-art method of FIG. 2.

In the prior-art method of FIG. 2, a required number of times of multiplication and addition is equal to $J \times (n_e^{(k)} - n_s^{(k)})$. In the typical case where $J = 16$ and $(n_e^{(k)} - n_s^{(k)}) = 48$, the required number of times of multiplication and addition is equal to 768. On the other hand, this embodiment requires maximum-value calculation for four values to be executed J times and requires addition to be executed $J + 1$ times. Thus, this embodiment only requires substraction to be executed $J \times 3 = 16 \times 3 = 48$ times and addition to be executed 17 times. Therefore, the calculation quantity of this embodiment is smaller than that in the prior-art method of FIG. 2 by one order.

As understood from the previous description, in this embodiment, the pattern matching process does not use a linear expansion and compression technique but uses a successive calculation technique in which, at a moment corresponding to a newest frame, the maximum similarity (the minimum distance) is automatically calculated on the assumption that the frame agrees with an end point. This embodiment can reduce a required calculation quantity and a required memory capacity in comparison with the prior-art method of FIG. 2. This advantage of this embodiment over the prior-art method of FIG. 2 is not taught by any of U.S. Pat. No. 3,816,722 to Sakoe et al., U.S. Pat. No. 4,751,737 to Gerson et al., and U.S. Pat. No. 4,712,242 to Rajasekaran et al.

DESCRIPTION OF THE SECOND PREFERRED EMBODIMENT

Figure 5:
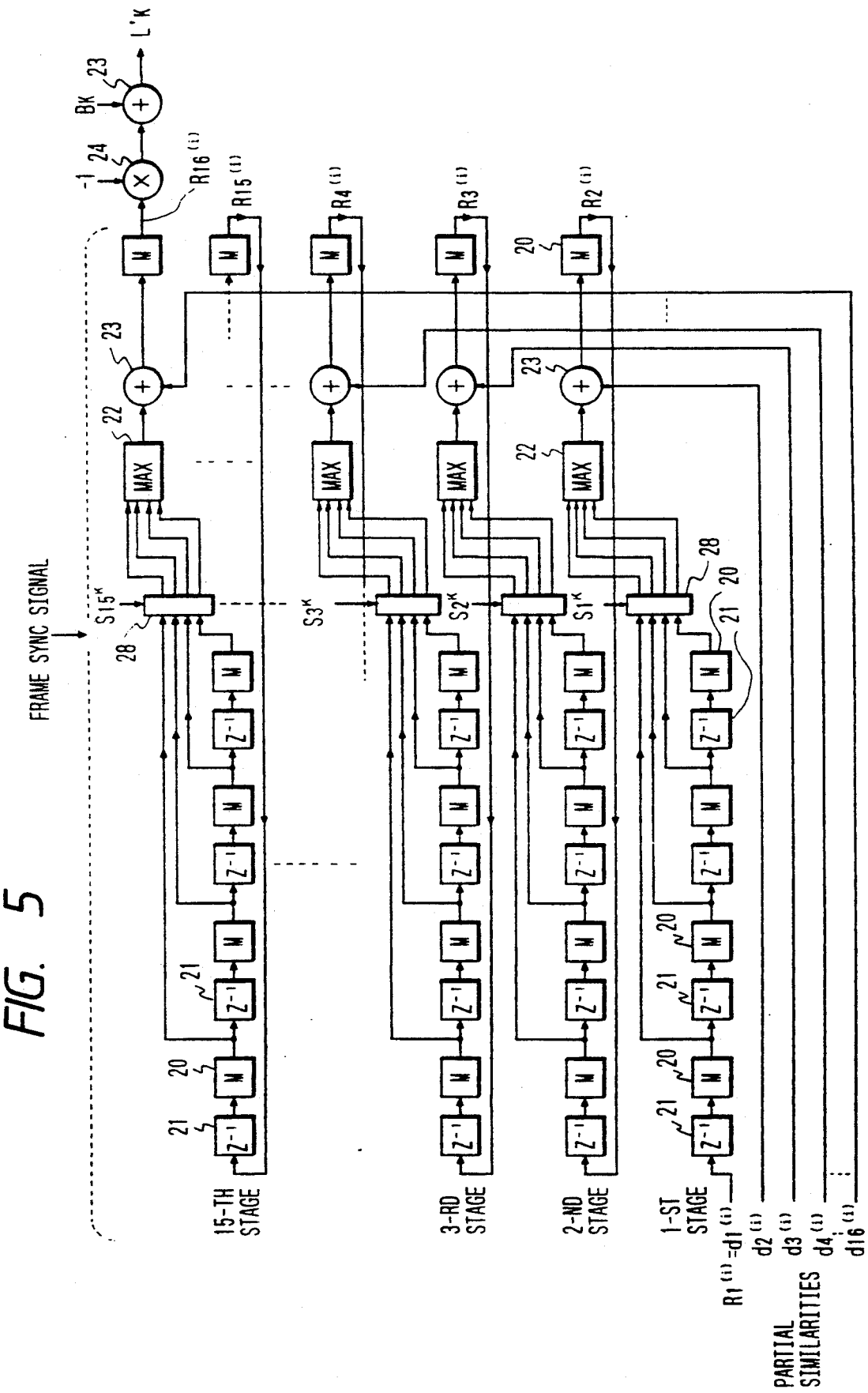
FIG. 5 is a block diagram of a similarity calculator in a speech recognition apparatus using a speech recognition method according to a second embodiment of this invention.

FIG. 5 shows an essential part of a second embodiment of this invention which is similar to the embodiment of FIGS. 3 and 4 except for design changes indicated hereinafter.

As shown in FIG. 5, in each of the stages, a data selector 28 is connected between the maximal value detector 22 and the memory elements 20. Each data selector 28 passes only data, designated by a control signal $S_j^k$, to the related maximal value detector 22. In the following description, the word-number-identifying adscript (superscript) "k" will be omitted from each of the characters "a", "d", and "R" for simplicity, and thus the characters "$a_j^{(k)}$", "$d_j^{(k)}(i)$", and "$R_j^{(i)}$" will be used instead of the characters "$a_j^{(k)}$", "$d_j^{(k)}(i)$", and "$R_j^{(k)(i)}$" respectively.

The accumulation value $R_1^{(i)}$ of the first stage is given as:

$$R_1^{(i)} = d_1^{(i)}$$

The partial accumulation values $d_2^{(i)}, \ldots, d_{16}^{(i)}$ of the respective later stages are given as:

$$R_j^{(i)} = d_j^{(i)} + \max_{S_j^k}(R_{j-1}^{(i-1)}, R_{j-1}^{(i-2)}, R_{j-1}^{(i-3)}, R_{j-1}^{(i-4)}) \quad (19)$$

where $j = 2, 3, \ldots, 16$, and the character $S_j^k$ denotes an operator of selecting one of subsets with respect to a set having elements in the parentheses. The operator $S_j^k$ depends on the matching stage number j and the word k. Thus, the character $$\max_{S_j^k}$$

represents the maximal value of elements of the subset designated by the operator $S_j^k$. The final similarity $L'_k$ is given as:

$$L'_k = B_k - R_{16}^{(i)} \quad (20)$$

In this embodiment, as understood from the equation (19), since the degree of freedom in selecting the partial similarities is controlled in accordance with the word "k" and the frame number "j", finer matching is allowed and thus more accurate recognition is enabled.

What is claimed is:

1. A method of speech recognition, comprising the steps of:

predetermining a series of parameter vectors $a_1^{(k)}$, $a_2^{(k)}, \ldots, a_J^{(k)}$ representative of standard patterns of speeches of preset words (k) respectively, where the letter k denotes a preset-word identifying number variable as $k = 1, 2 \ldots, K$, the letter J denotes a predetermined natural number common for all the preset words and the letter K denotes a predetermined natural number representing a vocabulary size;

deriving parameter vectors $x_i$ representative of data of respective frames of an input signal, wherein the adscript i denotes a frame number;

calculating similarities $d_j^{(k)}(i)$ between the parameter vectors $a_j^{(k)}$ and the parameter vectors $x_i$ by using a formula:

$$d_j^{(k)}(i) = a_j^{(k)} \cdot x_i,$$

where $j = 1, 2, \ldots, J$;

calculating parameters $R_j^{(k)(i)}$ for the respective preset words by referring to the following recurrence formulas:

$$R_1^{(k)(i)} = d_1^{(k)}(i)$$

$$R_j^{(k)(i)} = d_j^{(k)}(i) + \max(R_{j-1}^{(k)(i-h)}, R_{j-1}^{(k)(i-h-1)}, R_{j-1}^{(k)(i-h-2)}, \ldots, R_{j-1}^{(k)(i-h-m)})$$

where $j = 2, 3, \ldots, J$; the characters h and m denote preset positive integers; and the character max denotes an operator of selecting a maximal member of terms in related parentheses;

deriving a maximum value $R_J^{(k)(i)}$ for each k and each i; and determining one of the preset words as a recognition result, the determined word corresponding to the maximum value $R_J^{(k)(i)}$.

2. The method of claim 1 further comprising the step of varying the integers h and m in accordance with a variation in the value j during the step of calculating the parameters $R_j^{(k)(i)}$.

3. The method of claim 1 further comprising the step of varying the integers h and m in accordance with the preset words during the step of calculating the parameters $R_j^{(k)(i)}$.

4. A method of speech recognition, comprising the steps of:

predetermining a series of parameter vectors $a_1^{(k)}$, $a_2^{(k)}, \ldots, a_J^{(k)}$ representative of standard patterns of speeches of preset words (k) respectively, where the letter k denotes a preset-word identifying number variable as $k = 1, 2 \ldots, K$, the letter J denotes a predetermined natural number common for all the preset words and the letter K denotes a predetermined natural number representing a vocabulary size;

deriving parameter vectors $x_i$ representative of data of respective frames of an input signal, wherein the adscript i denotes a frame number;

calculating similarities $d_j^{(k)}(i)$ between the parameter vectors $a_j^{(k)}$ and the parameter vectors $x_i$ by using a formula:

$$d_j^{(k)}(i) = a_j^{(k)} \cdot x_i,$$

where $j = 1, 2, \ldots, J$;

calculating parameters $R_j^{(k)(i)}$ for the respective preset words by referring to the following recurrence formulas:

$$R_1^{(k)(i)} = d_1^{(k)}(i)$$

$$R_j^{(k)(i)} = d_j^{(k)}(i) + \max(R_{j-1}^{(k)(i-1)}, R_{j-1}^{(k)(i-2)}, R_{j-1}^{(k)(i-3)}, \ldots, R_{j-1}^{(k)(i-4)})$$

where j=2, 3, ..., J; and the character max denotes an operator of selecting a maximal member of terms in related parentheses;

deriving a maximum value $R_J^{(k)(i)}$ for each k and each i; and determining one of the preset words as a recognition result, the determined word corresponding to the maximum value $R_J^{(k)(i)}$.

5. A method of speech recognition, comprising the steps of:

predetermining a series of parameter vectors $a_1^{(k)}$, $a_2^{(k)}$, ..., $a_J^{(k)}$ representative of standard patterns of speeches of preset words (k) respectively, where the letter k denotes a preset-word identifying number variable as k=1, 2 ..., K, the letter J denotes a predetermined natural number common for all the preset words and the letter K denotes a predetermined natural number representing a vocabulary size;

deriving parameter vectors $x_i$ representative of data of respective frames of an input signal, wherein the adscript i denotes a frame number;

calculating similarities $d_j^{(k)}(i)$ between the parameter vectors $a_j^{(k)}$ and the parameter vectors $x_i$ by using a formula:

$$d_j^{(k)}(i) = a_j^{(k)} \cdot x_i,$$

where j=1, 2, ..., J;

calculating parameters $R_j^{(k)(i)}$ for the respective preset words by referring to the following recurrence formulas:

$$R_1^{(k)(i)} = d_1^{(k)}(i)$$

$$R_j^{(k)(i)} = d_j^{(k)}(i) + \text{opt}(R_{j-1}^{(k)(i-h)}, R_{j-1}^{(k)(i-h-1)}, R_{j-1}^{(k)(i-h-2)}, \ldots, R_{j-1}^{(k)(i-h-m)})$$

where j=2, 3, ..., J; the characters h and m denote preset positive integers; and the character opt denotes an operator of selecting an optimal member of terms in related parentheses;

deriving an optimal value $R_J^{(k)(i)}$ for each k and each i; and determining one of the preset words as a recognition result, the determined word corresponding to the optimal value $R_J^{(k)(i)}$.

6. The method of claim 5 further comprising the step of varying the integers h and m in accordance with a variation in the value j during the step of calculating the parameters $R_j^{(k)(i)}$.

7. The method of claim 5 further comprising the step of varying the integers h and m in accordance with the preset words during the step of calculating the parameters $R_j^{(k)(i)}$.

8. A method of speech recognition using word spotting, comprising the steps of:

predetermining a series of parameter vectors $a_1^{(k)}$, $a_2^{(k)}$, ..., $a_J^{(k)}$ representative of standard patterns of speeches of preset words (k) respectively, where the letter k denotes a preset-word identifying number and is variable in the range k=1, 2 ..., K, the letter J denotes a predetermined natural number corresponding to a common length of standard pattern for each of the preset words and the letter K denotes a predetermined natural number representing a vocabulary size;

deriving parameter vectors $x_i$ representative of data of respective frames of an input signal, wherein the adscript i denotes a frame number;

calculating similarities $d_j^{(k)}(i)$ between the parameter vectors $a_j^{(k)}$ and the parameter vectors $x_i$ by using a formula:

$$d_j^{(k)}(i) = a_j^{(k)} \cdot x_i,$$

where j=1, 2, ..., J; and a matching process based on non-linear expansion and contraction, including:

calculating parameters $R_j^{(k)(i)}$ for the respective preset words by referring to the following recurrence formulas:

$$R_1^{(k)(i)} = d_1^{(k)}(i)$$

$$R_j^{(k)(i)} = d_j^{(k)}(i) + \max(R_{j-1}^{(k)(i-h)}, R_{j-1}^{(k)(i-h-1)}, R_{j-1}^{(k)(i-h-2)}, \ldots, R_{j-1}^{(k)(i-h-m)})$$

where j=2, 3, ..., J; the characters h and m denote preset positive integers; and the character max denotes an operator of selecting a maximal member of terms in related parentheses;

deriving a maximum value of $R_J^{(k)}(i)$ for each k and each i; and determining one of the preset words as a recognition result, the determined word corresponding to the maximum value of $R_J^{(k)(i)}$.

9. The method of claim 8 wherein said non-linear expansion and contraction comprises the step of varying the integers h and m in accordance with a variation in the value j during the step of calculating the parameters $R_j^{(k)(i)}$.

* * * * *